Dec. 24, 1935.　　　　E. E. NYGREN　　　　2,025,070

METAL CUTTING MACHINE

Filed Feb. 12, 1932　　　5 Sheets—Sheet 1

Inventor

Edgar E Nygren

By Bates, Golrick & Teare

Attorneys

Dec. 24, 1935.   E. E. NYGREN   2,025,070
METAL CUTTING MACHINE
Filed Feb. 12, 1932    5 Sheets-Sheet 2

Inventor
Edgar E. Nygren
By Bates, Golrick & Teare
Attorneys

Dec. 24, 1935.　　　　E. E. NYGREN　　　　2,025,070
METAL CUTTING MACHINE
Filed Feb. 12, 1932　　　5 Sheets-Sheet 3

Inventor
Edgar E. Nygren
By Bates, Golrick & Teare
Attorneys

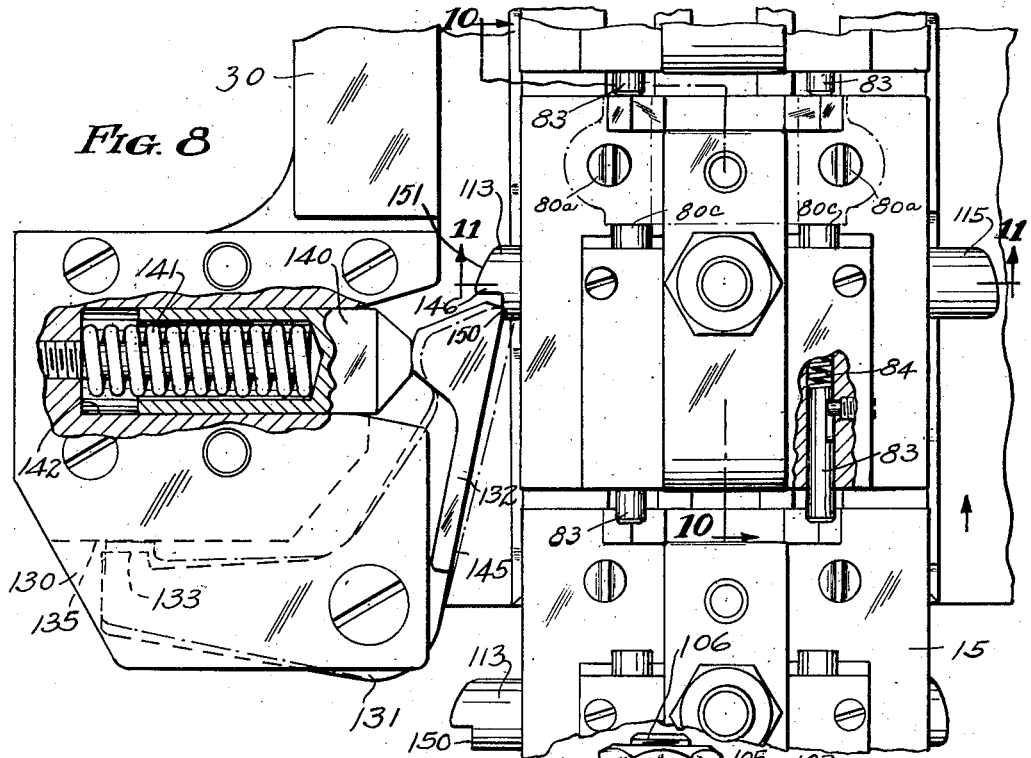
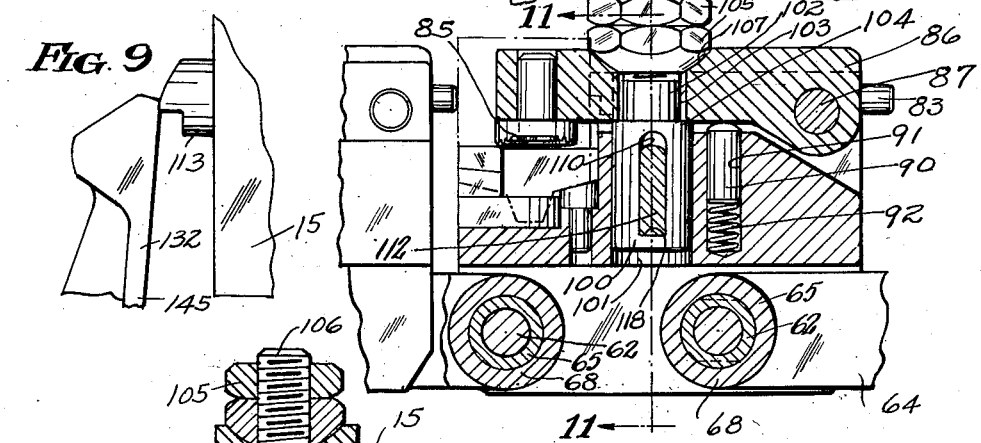
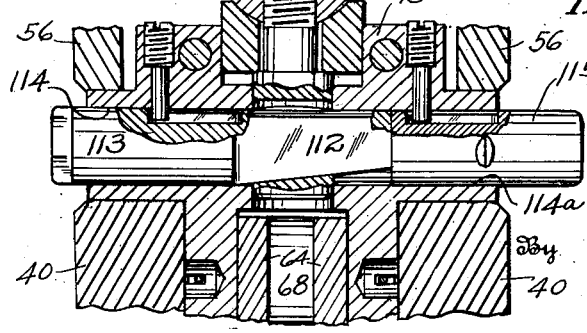

Dec. 24, 1935.　　　　E. E. NYGREN　　　　2,025,070
METAL CUTTING MACHINE
Filed Feb. 12, 1932　　　5 Sheets-Sheet 5

Inventor
Edgar E. Nygren
By Bates, Goldrick & Teare
Attorneys

Patented Dec. 24, 1935

2,025,070

UNITED STATES PATENT OFFICE 2,025,070

METAL CUTTING MACHINE

Edgar E. Nygren, Cleveland, Ohio, assignor to The Foote-Burt Company, Cleveland, Ohio, a corporation of Ohio Application February 12, 1932, Serial No. 592,574

29 Claims. (Cl. 90—33)

This invention relates to a metal cutting machine and particularly to that type of metal cutting machine commonly known as a "chain broaching machine". Such machines generally comprise a frame, upon which a stationary broaching tool or tools are rigidly secured. The broaches are arranged to coact with work, which is progressed past and in contact with the broaches. The work is carried by a series of work holders which are secured to an endless chain member or its equivalent.

The primary object of the present invention is to provide a chain broaching machine to meet the high production requirements of modern manufacturing establishments, and which machine will cut or surface articles of work with a high degree of accuracy and at a comparatively high speed.

Another object is to provide a chain broaching machine with an automatically operated mechanism arranged to clamp the work in position on the work holding members of the chain, and subsequently automatically release the work.

A further object is to provide a series of interconnected workholders for a chain broaching machine, which workholders will be arranged to automatically clamp work thereon with a high degree of accuracy.

Other objects of this invention will become more apparent from the following specification, which refers to a preferred embodiment of my invention shown in the accompanying drawings. The essential characteristics of the invention will be set forth in the appended claims.

Figure 1:
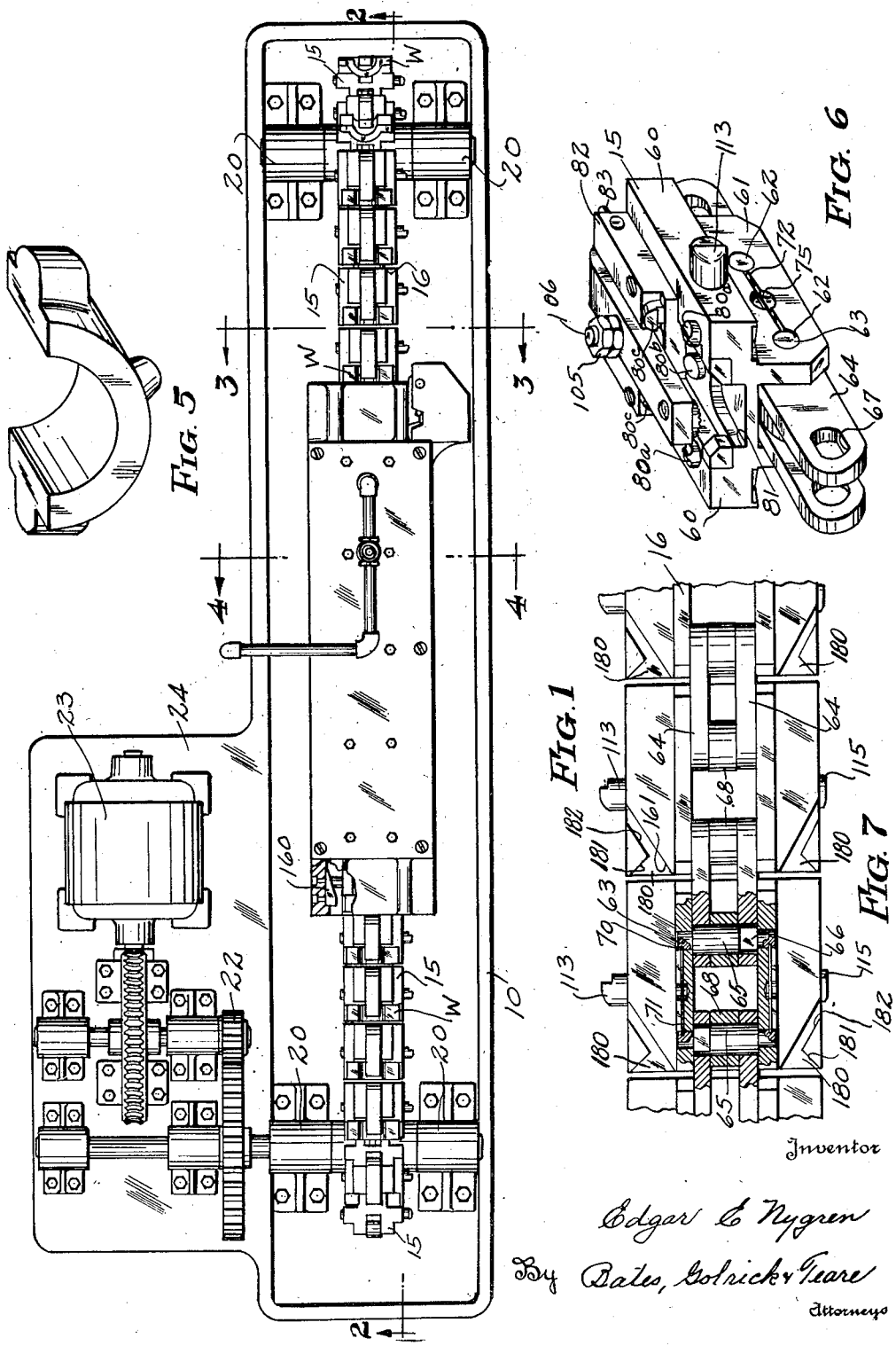
Figure 2:
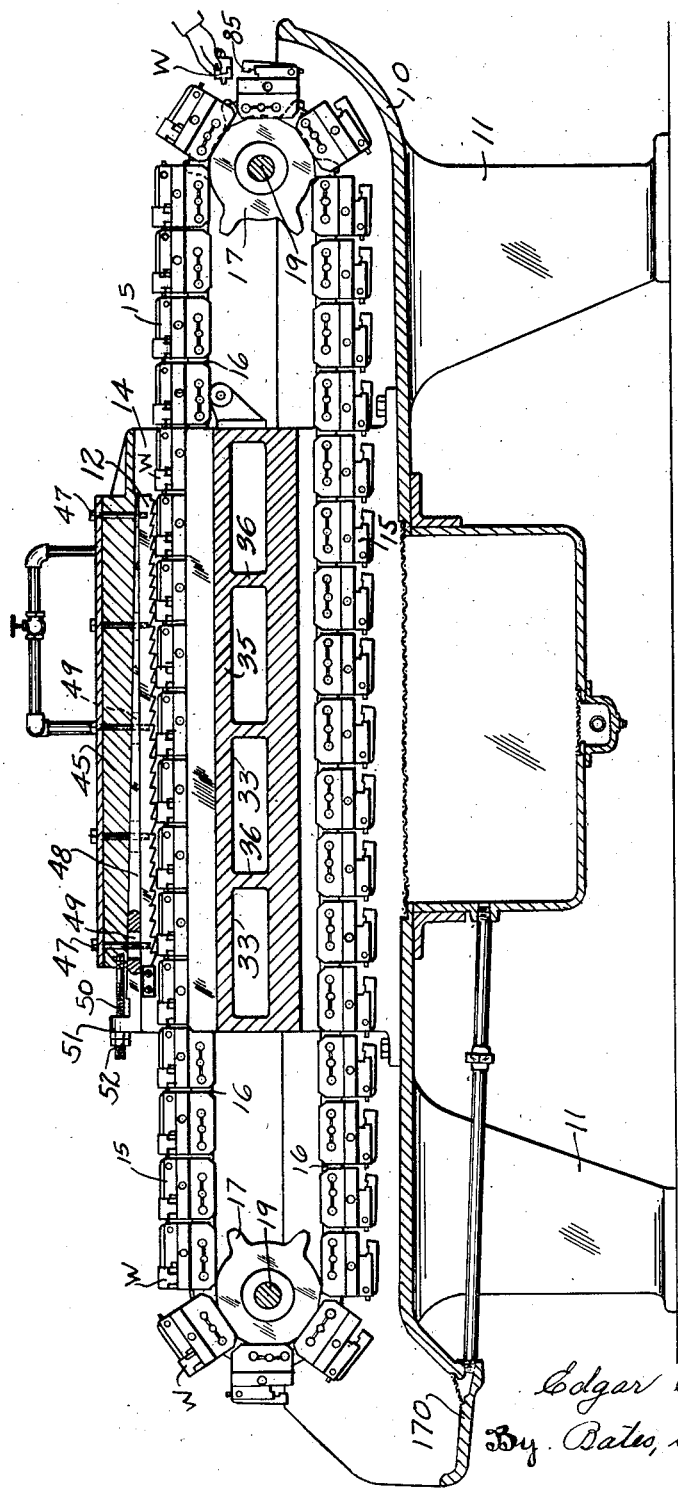
Figure 3:
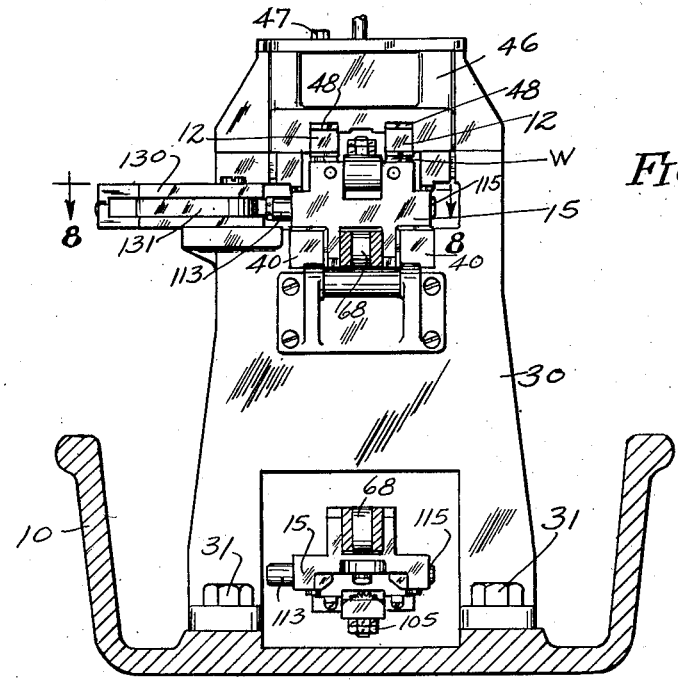
Figure 4:
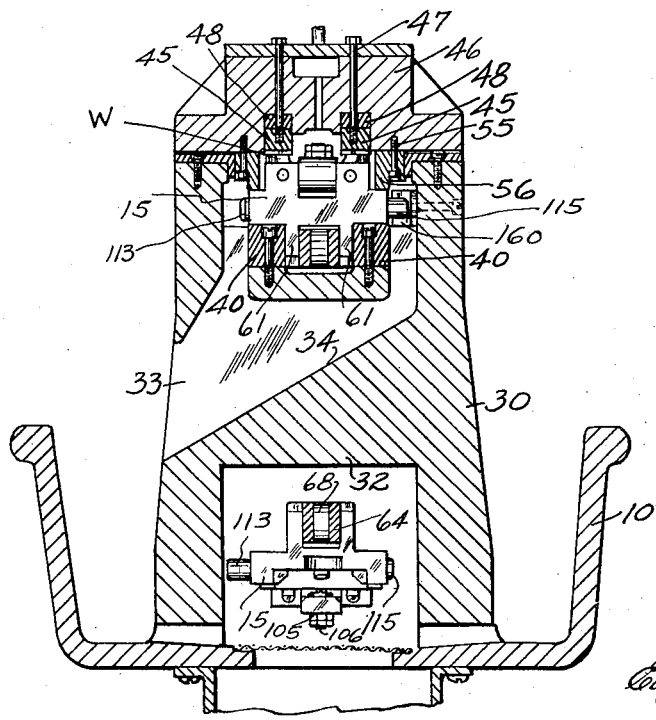
Figure 12:
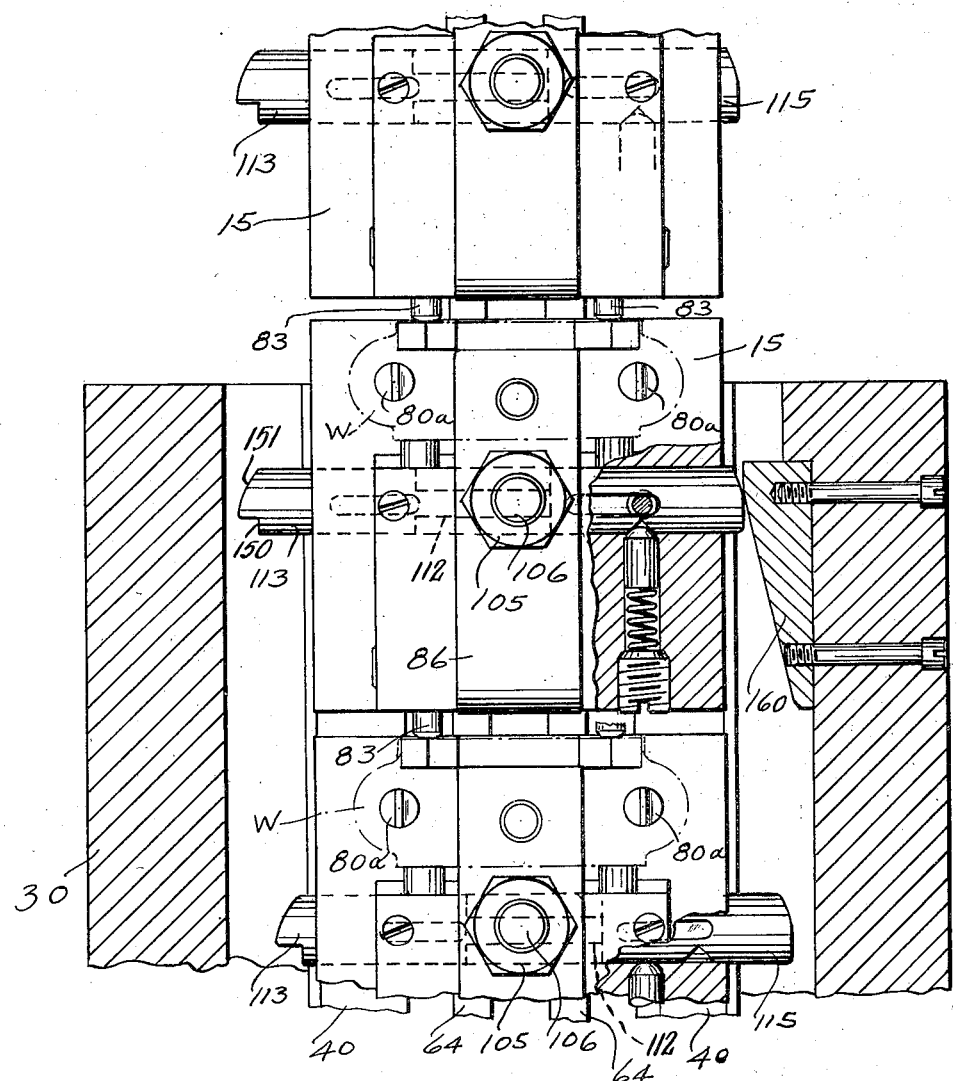

In the drawings, Fig. 1 is a plan of a broaching machine embodying my invention; Fig. 2 is a substantially centrally located vertical section, as indicated by the lines 2—2 on Fig. 1; Figs. 3 and 4 are vertical transverse sections, as indicated by the lines 3—3 and 4—4 respectively on Figs. 1 and 2; Fig. 5 is a perspective of one type of work, which my improved broaching machine is arranged to surface; Fig. 6 is a perspective of a link of the chain which serves as a work holder; Fig. 7 is a bottom view, partially broken away illustrating the construction of the chain; Fig. 8 is a sectional detail of the chain and certain coacting mechanism, the plane of this section being generally indicated by the lines 8—8 on Fig. 4; Fig. 9 is a detail section of certain of the parts illustrated in Fig. 8, illustrating such parts in a different position; Figs. 10 and 11 are sectional details as indicated by the lines 10—10 and 11—11 respectively on Fig. 8; Fig. 12 is a sectional detail, illustrating the manner of unlocking the work in the work holders.

In the past, chain broaching machines have been used for broaching work where comparatively great variations of depth and location of cut were permissible, such as the castellating of nuts. However, the field for such machines has been heretofore greatly limited, as an exceedingly accurate cut could not be made with such machines. It is quite obvious that there is a large field for a chain broaching machine which will surface or otherwise machine objects of work with a high degree of accuracy such as will meet the requirements of the present day automotive and other similar industries.

In the past, the chain structure which supported the work holders did not permit accuracy of cut as required by such industries. Likewise, the construction of the work holder and the guideway for the work holder during the broaching operation did not prevent chattering of the work with its attendant result of uneven and inaccurate depth and position of the cut, confining the use of such machines to articles such as castellated nuts. Further, the work holders of the chain broaching machines of the past did not clamp the work with a sufficiently high degree of accuracy to enable an accurate or precision cut to be made on one surface of the work relative to a previously machined or cut surface.

The present invention contemplates the provision of a chain broaching machine having an improved work holder, so constructed that it will occupy a comparatively small space, and yet which will enable the rapid automatic clamping and releasing of work with a high degree of accuracy, and which will clamp or retain the work in such a manner as will prevent the chattering of the work relative to the work holder. My improved chain broaching machine also includes a novel arrangement for operating the clamping mechanism to more readily simulate the operation as manually performed on a manually operable clamp. Likewise, this invention contemplates the provision of a rugged chain, so constructed that it will enable the positioning of the chain in the guideway in such a manner as will eliminate for all practical purposes, any chattering or movement of the work holders, other than the prescribed longitudinal movement between the chain and the guideway, thereby enabling a cut of high degree of accuracy to be made upon the work relative to previously finished surfaces thereof.

The frame of my improved broaching machine comprises, as illustrated, an elongated hollow base 10, supported by suitable legs 11, and arranged to provide a receptacle for chips and waste material resulting from the broaching operation. The broach 12 is carried by a bridge-like structure 14, mounted on the frame intermediate its ends. The work or material to be broached is removably carried by a series of work holders 15, which comprise, as will be hereinafter described, a chain 16. The chain 16 is carried by suitable sprockets 17, rigidly secured to shafts 19, mounted in bearings 20 carried by the frame 10. The general arrangement of the mechanism is such that the shaft 19, which supports the left-hand sprocket 17 as shown in Figs. 1 and 2, is driven through gearing 22 from a suitable source of power such as the motor 23 supported on a table-like portion 24, of the frame 10. The motor and gearing are arranged to cause the upper stretch of the chain 16, and the work holder 15 thereof to be carried toward the left (Figs. 1 and 2) to convey the work or material to be broached past the stationary broaches 12 supporting the bridge structure heretofore described.

The bridge or broach supporting member 14 which supports the broaching tools provides a supporting surface or guide for the work holding chains 16 during the broaching operation. As shown in Figs. 2, 3 and 4, the bridge 14 comprises an H shaped elongated casting 30, arranged to be rigidly secured to the bed of the machine by suitable bolts 31. The arrangement is such that the upper stretch of the chain 16 passes between the upper portion of the side members of the casting, while the lower or return stretch of the chain passes between the lower portions of such side members. A cross member 32 of the casting bridges the legs intermediate these ends, and forms a shelf below the upper stretch of the chain 16 to prevent chips and other waste material, resulting from the broaching action, from falling onto the lower stretch of the chain. One side wall of the casting 30 is provided with a series of elongated openings 33, arranged to communicate with the upper chain passage in which the work is broached. The upper surface 34 of the cross member 32 is beveled to cause the cutting fluid to readily carry away the chips through the openings 33 to the basin-like frame member 10.

The casting 30 is arranged to provide a guide and support for the work holders during the broaching operation. The chain supporting surface of the casting comprises a horizontally extending bar 35, integrally joined with the casting 30 by a series of transverse webs 36 as shown in Fig. 2. The bar 35 is spaced apart from the side walls of the casting 30 to readily permit the passage of chips therebetween. Rigidly secured to the upper surface of the bar 35 are a pair of spaced elongated bearing rails 40, arranged to provide a wearing surface for the chain, as will hereinafter be more fully described.

The broach or broaches 12 are adjustably carried by the bridge 14. As shown in Figs. 2 and 3 I have shown two broaches spaced from and overlying the chain supporting surfaces 40. Each broach comprises an elongated bar 45, carried by an upper frame cap 46, which is secured to and bridges the legs of the H casting 20. Each toothed broach member 45 is threadingly engaged by suitable bolts 47 carried by the cap 46 and arranged to retain the broach in position against a wedge bar 48, which is interposed between the upper surface of the broach and the lower surface of the cap 46. The wedge bar is provided with elongated slots 49, through which the bolts 47 pass, and is adjusted by means of an adjusting screw 50, rigidly secured to the cap member 46 and adjustably secured to an upstanding ear 51 of the wedge bar 48 by suitable lock nuts 52. The bolt openings in the cap 46 are enlarged an amount sufficient to care for the swinging action of the broach, which, as shown, is arranged to pivot downwardly about an axis located to the right of the machine, (Fig. 2), as the wedge is moved.

The cap 46 also carries a pair of guide rails which co-act with the chain members to retain them in constant contact with the lower guides 40, heretofore described. Rigidly secured to the underside of the cap 45 by suitable bolts 55 are a pair of elongated guide rails 56, arranged to engage the upper surface of the work retaining members 15 of the work holding chain. The guide rails 56 are superimposed above the guide rails 40, and spaced apart therefrom a distance sufficient to provide a sliding fit for outwardly extending ribs 60 on the work holders 15. The upper rails 56 therefore serve to retain a work holder 15 in contact with the lower guide rails 40 during the entire cutting operation of the broach, there being only sufficient freedom between the rails 35 and the rails 56 to permit the sliding action of the work holder, thereby preventing any chattering, or movement up and down of the work, due to the cutting action of the broaches.

As heretofore described, the chain on which the work is mounted comprises a series of work holders 15, arranged to form integral links of the chain. Each work holder is provided with a pair of spaced downwardly extending ribs 61, provided with openings 62, through which pins 63 pass to secure the work holders to adjacent pairs of links 64, which, in turn, are connected to the next adjacent work holders.

The connection between the links 64 of the chain and the work holders is arranged to reduce, to a minimum, the movement of the pin 63 relative to the work holder. As shown in Figs. 7 and 10, there is loosely mounted on each pin 63 a bushing 65, the outer periphery of which is flattened at one end, as at 66, to cooperate with elongated openings 67 in one end of the links 64, preventing relative movement between the bushings and the links. Rotatably mounted on each bushing intermediate each pair of links 64 is a roller 68, arranged to cooperate with the teeth of the sprockets 17, which support and drive the chain. Therefore, as the bushing can only turn with the link 64, the rolling action imparted to the roller 68, due to the reaction of the sprocket teeth, is prevented from being imparted to the pin.

In the construction shown, the work holders comprise links of the chain. Nevertheless, the wear on the chain is to a great extent restricted to the rollers, the bushings and the pins. It has therefore been found expedient to so retain the pins 63 in position on the chain links that the parts may be readily replaced. The outer walls of the ribs 61, which carry the pin are arranged, to coact with the inner walls of the guiding bars 35 to prevent transverse movement of the chain or work holders during the broaching operation, and I have therefore arranged the pin and its retainer in a manner which will not interrupt the continuity of the outer surface of the wall 61. As shown in Figures 6 and 7, the pins 63 are slightly shorter than the out-to-out dimension or width of the chain. Each pin is provided with radially extending openings 70 adjacent opposite ends thereof and arranged to receive the ends of spring members such as the wires 71. The springs 71 seat in slotted recesses 72 in the wings 61 of the work holders.

The assembly of the pins is as follows: The opposite ends of a spring member 71 is inserted in the openings 70, on one side of a pair of pins, and the pins inserted in the links until the spring member seats in the recess 71 in one wing 61. Another spring is then inserted in other opening 70 of one of the pins, which now aligns with the slot 71 of the other wing 61. The spring is then bowed and permitted to spring into the opening 70 of the other pin. Both the springs and the pins will now be entirely within the confine of the links. The links are provided with an opening 75, located between the two pins and extending into the link a distance greater than the normal position of the spring member. Therefore, when it is desired to remove a spring member, a hook is inserted in the opening 75 and brought into engagement with the spring and withdrawn, thereby withdrawing the spring member.

The bottom face of each work holder is formed to prevent chips and other waste material from wedging between the work holder and its supporting guide rails 40, as well as to insure constant lubrication of the parts. As shown in Fig. 7, the forward under surfaces of each work holder have a groove or slot 180, the forward walls 181 of which are sloped, inwardly from the foremost corners of the work holder and toward the center of the work holder and are then turned outwardly from a parallel walled slot 182 which opens on the outside face of the work holder. Hence, the chips which fall to the guide rails between the work holders are carried through the slot and discharged from the rails.

Each work holder 15 is provided with a clamping mechanism arranged to accurately clamp the work in position thereon for the broaching operation. As shown in the drawings, and especially Figs. 6 and 12, inclusive, the work holders 15 are arranged to have the work manually placed thereon against a series of precision positioning pins 80. The positioning pins are preferably removably secured to the work holder, so that they may be readily changed to adapt the machine for various articles of work. As shown in Fig. 6, each work holder is provided with a pair of pins 80a, located in the upper surface of the wings 60, a pin 80b located in a work retaining recess 81 of the work holder, and a pair of pins 80c located at the forward wall of a boss 82, which rises above the upper surface of the wings 60. This arrangement permits the work W to be manually dropped into place on the pins 80c when the work holder approaches the vertical position in rounding the rearmost sprocket 17, in which positon a work clamping mechanism, hereinafter described, is in an open position.

As shown the work is clamped against the pins 80c by a pair of spring pressed members carried by the next preceding work holder. As each work holder is progressed around the rearmost sprocket, the distance between the foremost wall of such work holder and the rearmost wall of the next preceding work holder, is first increased, during which time the work is placed in position either manually or by any well known automatic feeding mechanism. As the work holder rises above the axis of the sprocket, the distance between it and the next preceding work holder is decreased until when the work holder reaches a point where it is in the vertical plane tangent to the top of the sprocket, this distance is at a minimum. As the distance between the work holders is decreased, a pair of plungers 83, carried in the boss 82 of the next preceding work holder, are urged into contact with the work by suitable compression springs 84, thereby forcing the work against the pins 80c, heretofore described.

Shortly after the work has been positioned against the pins 80c, a clamping mechanism is operated to clamp the work against the lower work retaining pins 80a. As shown in Figs. 2 and 10, the work is positioned in the work holder 15 between a gripping surface 85 and the lowermost pins 80a. The arrangement is such that the gripping surface 85 is clamped against the work shortly after the work is forced against the pin 80c by the plungers 83. As shown in Fig. 10, the gripper member 85 is carried in an arm 86, pivotally mounted on a transversely extending pin 87, carried by the boss 82, of the work holder. The gripper arm 86 is normally retained in an open position. To this end a plunger 90 is carried in a vertically extending recess 91 in the work holder, and is normally urged into contact with the lower surface of the arm 86 by a suitable compression spring 92.

The clamp 86 is arranged to automatically clamp the work against the pins 80a after the work has been clamped against the pins 80c, and before the work holder reaches the broach. As shown in Figs. 10 and 11, a vertically extending plunger 100 is slidably mounted in a cylindrical opening 101 in the work holder, in a position below the clamp arm 86. The upper end of the plunger 101 is reduced in section as at 102 and this reduced section is arranged to pass through a slightly enlarged opening 103 in the clamp arm. The clamp arm 86 is rockably secured to the plunger between a shoulder 104 and suitable lock nuts 105 carried by a threaded portion 106 of the pin which extends above the clamp arm. The lower nut 105 is provided with a convex surface, arranged to coact with a concave seat 107 in the clamp arm, to permit the arm to rock without binding the pin in either the work holder or the clamp arm.

The plunger 100 is raised and lowered to rock the clamp arm by a wedge member 112. As shown in Fig. 10 the plunger has a transverse slot 110 within which the wedge 112 is slidably mounted. The wedge 112 is integral with and extends from a plunger 113, reciprocably mounted in a transverse opening 114 in the work holder. A plunger 115 is slidably mounted in an opening 114a in the work holder and is arranged to engage the opposite end of the wedge, so that by exerting pressure on the plungers 113 and 115 sequentially, the wedge will be caused to alternately engage and disengage the lower surface 118 of the slot 110, thereby causing the arm 86 to alternately clamp and release the work.

The relation of the clamping member 85 to the pins 113 and 115 and the wedge 112 is such that if the pin 113 is moved inwardly towards the work holder, it will cause the arm 86 to clamp the work, while the reverse is true if the plunger 115 is moved inwardly. In Figs. 8 and 9 I show a preferred form of mechanism to move the pin 113 toward the work holder and clamp the work in the work holder. This mechanism is arranged to simulate the hammer blow that a workman would normally give the plunger were he to manually strike it. Pivotally mounted in a forwardly extending portion 130 of the H frame, is a bell crank 131, one arm 132 of which is arranged to engage the outer face of plunger 113, which extends outwardly from the work holder. The other arm of the bell crank is provided with a face 133 arranged to engage a frame surface 135 to prevent an overthrow of the arm, and to limit the position of the bell crank when not in engagement with the plunger 113. As shown in the drawings, the arm 132 of the bell crank is normally urged toward the work holder by a plunger 140 through the medium of a compression spring 141, both of which are mounted in a cylindrical opening 142 in the frame member 130. The arrangement is such that the spring normally urges the arm 132 of the bell crank toward the chain and into the path of the plungers 113.

The chain normally progresses in the direction of the arrow in Fig. 8. Therefore, when a plunger 113 strikes the surface 145 of the bell crank 131, that plunger will be resiliently cammed inwardly.

The spring 141 is of sufficient strength to overcome the reaction of such movement. It will be noted, however, that the face of the plunger 113 is provided with an abruptly interrupted surface. As shown, the rearmost portion of the plunger 113 is cut back, as at 150, providing two surfaces of different levels. Hence, when the work holder, together with its plunger, is drawn in the direction of the arrow, Fig. 8, the bell crank will coact with the face 151 of the plunger and the latter will be forced inwardly toward the work holder, camming the clamp 86 to a clamping position. However, the continued movement of the plunger will cause the end of the arm 132 of the bell crank to fall or drop from the surface 151 of the plunger onto the surface 150, and due to the action of the spring 142 a hammer-like blow will be imparted to the plunger 113 by this dropping action. This, therefore, imparts a blow to the clamping wedge 112, very similar to that that a workman would manually deliver with a hammer. It is, of course, evident that the parts may be reversed,—that is, the bell crank may be provided with an interrupted surface and the plunger with a regular surface without affecting the result.

After the broaching operation has been completed and the work holder has passed beyond the broach, the plunger 115, which extends outwardly from the face of the work holder, is cammed inwardly toward the work holder, by a stationary cam 160, carried by a frame member 40. The spring 92, heretofore described, causes the clamping arm 86 to rock about its pivot, freeing the work, which will drop under the influence of gravity when the work holder rounds the forward sprocket 17.

From the foregoing description, it is evident that I have provided a chain broaching machine with a series of interconnected work holders, so arranged relative to their supporting and guiding surfaces that a high degree of accuracy of cut may be obtained. I have likewise provided a rigid structure and so arranged the moving work holders and cutting tool relative to such structure that all chattering between the work holders and their supporting structure is for all practical purposes eliminated.

I have also provided a work holder arranged to precisely clamp the work therein against movement toward or away from the work and so arranged the clamping mechanism that when the same is in a clamped position it is held in such position by metal to metal contact without the use of a resilient member.

Likewise, I have included in this clamping mechanism a wedge which is automatically given a hammer-like blow, driving it in place with comparatively great force. I have likewise clamped the work in a direction parallel to the cutting tool in such a manner as to permit it to drop free from the forward unobstructed end of the work holder, the clamping means for so retaining the work being carried by the next preceding work holder. The machine will therefore position the work and retain it in position on the work holder against comparatively great cutting strains with a high degree of precision.

I claim:

1. The combination, with a metal cutting machine including a metal cutting tool, of a series of inter-connected work holders arranged to retain work to be operated upon by the said tools, means to position the work on such work holders including means carried by the adjacent work holder, and independent clamping means carried by each workholder to clamp the positioned work.

2. The combination with a metal cutting machine including a relatively stationary metal cutting tool, cf a series of work holders pivotally inter-connected together in an endless chain formation, a pair of annular members around which the chain is looped, means to progress said chain, a work holder including means to retain the work in position thereon against movement in one direction, said means arranged to be released consequent upon the progress of the chain around said annular member, and independent means carried by each workholder to retain the work against movement in another direction subsequent to the movement of the first named retaining means to an active retaining position.

3. In a metal cutting machine, a frame including an H-shaped member, an endless chain member including a series of work holders, annular members around which the chain is looped with the long stretches of said chain embraced by the upper and lower sides of the frame member respectively, means to progress said chain, a guideway spaced apart from the walls of the H member and located between the upper side members thereof, said guideway including a pair of spaced guide members arranged to bear against opposite sides of the work holder and on which the work holders are supported, a cap member rigidly secured to and bridging the upper sides of the H member, means to connect the cutting tool to said cap member in position to engage work held by said work holders, a second pair of guide rails carried by the cap member and arranged to bear against the upper surface of the work holders to retain the work in position against the lower guide rails, and wherein said last-named guide rails are spaced apart from the side walls of the work holders.

4. In a metal cutting machine, including a metal cutting tool, a series of interconnected work holders arranged in an endless chain formation, means to progress said chain, a guideway to support the work holders during the cutting operation, means to eject from the supporting guideway chips and other waste material falling onto the guideway during the broaching operation, said means including laterally and rearwardly deflecting surfaces formed by side walls of a slotted recess in the bottom wall of said work holders.

5. In a metal cutting machine, a frame having a pair of upwardly extending spaced walls, an endless chain member including a series of work holders, an annular member around which the chain is looped, means to progress said chain wherein one stretch of said chain is embraced by and spaced apart from the upwardly extending walls of said frame, a guideway spaced apart from the walls of said frame between the upper sides thereof, said guideway including a pair of spaced guide members arranged to bear against opposite sides of the work holder and on which the work holders are supported, a cap member rigidly secured to and bridging said walls, means to connect the cutting tool to said cap member in position to engage work held by said work holders, a second pair of guide rails arranged to bear against the upper surface of the work holders to retain the work holders in position against the lower guide members, wherein said last-named guide rails are spaced apart from the side walls of the work holders, and means to clear said lower guideway of chips and other waste material resulting from the cutting operation.

6. In a metal cutting machine, including a metal cutting tool, a series of interconnected work holders, each work holder comprising a member having a pair of downwardly depending ribs arranged to receive a pair of pivot pins having radial openings adjacent the opposite ends thereof, a bushing rotatably mounted on each of said pins intermediate said ribs, a link rigidly secured to said bushing and arranged to connect the work holder with the next adjacent work holder, and a pair of spring members on opposite sides of the work holder seating in the openings in respective ends of the pins and arranged to lie within the confines of the walls of said ribs.

7. In combination with a metal cutting machine, including a relatively stationary metal cutting tool, of a series of work holders pivotally inter-connected together in an endless chain formation, a pair of annular members around which the chain is looped, means to progress said chain, a work holder including means to retain the work in position thereon against movement in one direction, said means arranged to be released consequent upon the progress of the chain around said annular member, clamping means to retain the work in position on the work holder against movement in another direction, a wedge operatively connected to said clamping means, means to impart a sharp blow on said wedge subsequent to the movement of the first named retaining means to an active retaining position and thereby cause the clamping means to grip the work, means to move said wedge to cause the clamping means to release the work, and wherein the first named retaining means is released consequent upon its movement around the annular members.

8. In a metal cutting machine, including a metal cutting tool, a plurality of work holders arranged to retain work in the position to be cut by said tool, each work holder including a clamp to retain the work in the work holder, a wedge operative to move the clamp into clamping position, means cooperating with all of said work holders and having a surface to contact with a surface of said wedge to move the clamp to a clamping position, one of said last-named surfaces being provided with a plurality of spaced contact faces in different planes, resilient means normally acting to urge said means towards the wedges, and means to move the work holders across the path of said means thereby causing a hammer-like blow to be imparted to the clamping means.

9. In a metal cutting machine including a metal cutting tool and having a series of interconnected workholders arranged to retain work to be operated on by such tools, means to position work on such workholders including means carried by adjacent workholders and operatively arranged to automatically position and release the work, means carried by the workholders and independent of said positioning means to clamp the work therein, and means acting subsequently to the positioning operation of said first-named means to cause said clamp to grip the work independent of said positioning means, and means to release said clamp before said positioning means is released.

10. In a metal cutting machine, a frame, a workholder movably mounted on said frame, clamping means carried by the workholder to retain the work thereon, operating means for said clamp including means carried by the workholder and a member carried by the frame arranged to be struck by said first-named means to cause the clamp to grip the work, resilient means carried by the frame, means to compress said resilient means, means to retain said resilient member compressed, means operative to release said resilient means causing the member carried by the frame to strike the operating member carried by the workholder to give it a sharp blow to tighten the grip of the clamping means, whereby the gripping strength is not dependent upon relative movement between the workholder and the frame.

11. In a metal cutting machine including a metal cutting tool, a workholder to support work in position to be cut by said tool, a clamp carried by the workholder to retain work therein, a pair of independently movable coacting operating members to cause said clamp to grip the work, one of said members being carried by the workholder and operatively connected to said clamp, means to cause one of said members to move into engagement with the other at a predetermined rate of speed whereby the impact between the two members is fixed, and whereby the work is gripped by the clamp, and means acting subsequent to said impact to cause a second impact between said members and thereby increase the gripping action of said clamp.

12. In a cutting machine including a cutting tool, a workholder, a clamp to retain work in position on said workholder, operating means for said clamp, automatically acting means to deliver successive impacts to said operating means and wherein the work is gripped by the clamp under the influence of the first impact and such grip is increased under the influence of the second impact.

13. In a metal cutting machine, a frame, a workholder arranged to receive objects to be cut, means to clamp objects in position on said workholder, a member operatively connected to said clamping means and carried by the workholder, a second member carried by said frame, means to move the workholder relative to the frame and cause one of said members to strike the other member, one of said members having a plurality of contact surfaces arranged to be successively engaged by the other member, the engagement with the first of said surfaces operating to cause the clamp to grip the work and the engagement of the second surface operating to increase the clamping pressure of the clamp on the work.

14. In a metal cutting machine including a metal cutting tool, a support to which the tool is secured, a workholder arranged to receive articles to be cut, a clamp to clamp work in position on said workholder, means to cause relative movement between the tool and the workholder, operating means for said clamp including a member carried by the workholder and a member movably carried by the tool support, resilient means acting to project said last named member into the path of the other member, one of said members having a plurality of contact steps, one of said steps contacting with the other member due to the relative movement between the tool support and the workholder, the succeeding step being set back from the first step to permit the resilient means to thrust one member toward the other consequent on further relative movement between the workholder and the tool support, thereby causing a second impact on the member carried by the workholder, and wherein the strength of the second impact is not limited by relative movement between the workholder and the tool support.

15. In a machine tool, a workholder, means for moving said workholder along a predetermined path, a holding device carried by said workholder, said device being operable by a blow, means for delivering a blow to said device, said means being movably supported adjacent the path of travel of the workholder and arranged to contact with said holding device whereby a blow is delivered to said device by initial contact of said device with the blow delivering means due to the passage of the workholder along said path, contact means carried by the workholder and adapted to make extended contact with the blow delivery means, power storage means operable by extended contact of the contact means with the blow delivering means, means to release the power storage means when the device is adjacent said means, and means to transmit a blow from the power storage means to the device upon such release of the power storage means.

16. In a machine tool, a workholder adapted to move in a confined path, driving means for said workholder, a holding device carried by said workholder, said device being operable by a blow, means adjacent the path to contact with the device with a light blow, power storage means adapted to deliver a blow to said device, means operable by the driving means to store power in said storage means, and means to release said storage means when the device is in position to receive the blow from said storage means.

17. In a machine tool, a workholder adapted to move in a confined path, driving means for said workholder, a holding device carried by said workholder, said device being operable by a blow, power storage means to deliver a blow to said device, means operable by the driving means to store power in said storage means, and means to release said storage means when the device is in position to receive the blow from said storage means.

18. In a machine tool, a workholder, adapted to move a confined path, driving means for said workholder, a holding device carried by said workholder, said device being operable by a blow, spring means to deliver a blow to said device, means operable by the driving means to store power in said spring means, and means to release said spring means when the device is in position to receive the blow from said spring means.

19. In a metal cutting machine, a work holder arranged to receive objects to be cut, means carried by the work holder to clamp said objects in position on said work holder, operating means to cause said clamping means to clamp the work in the work holder, said operating means including a pair of coacting members one of which is operatively connected to the clamp, means to move one of said members into contact with and past the other, one of said members having two contacting surfaces separated from each other and arranged to be successively engaged by the other member, a resilient means normally acting to move one of said members toward the other, and means independent of said contacting surfaces to release said clamp.

20. In a metal cutting machine, a work holder arranged to receive objects to be cut, clamping means carried by the work holder to clamp said objects in position on said work holder, operating means for said clamp including a pair of coacting members one of which is operatively connected to the clamp, means to move one of said members relative to the other member, wherein one of said members is provided with a plurality of non-contiguous contact surfaces at different levels and arranged to successively contact with one surface of the other of said members to cause the clamp to grip the work, and wherein one of said members is carried by the work holder and the other of said members is resiliently urged into a contacting position therewith.

21. In a metal cutting machine, a work holder arranged to receive objects to be cut, means to clamp said objects in position on the work holder including a pair of coacting members one of which is arranged to be moved bodily past the other, means to cause one of said members to be moved past the other member, one of said members having an abruptly interrupted contact surface and a second contact surface to contact with the other member subsequent to the contact between the first named surface and said member to clamp the objects in position, resilient means to normally retain the members in contact with each other, whereby when one member is moved past the interrupted surface and strikes the second surface of the other a hammer-like blow is imparted to one of said members.

22. In a metal cutting machine including a metal cutting tool, a plurality of work holders arranged to retain work in the position to be cut by said tool, each work holder including means to clamp work thereon, means cooperating with said work holders to contact with and cause said clamping means to grip the work, one of said last-named means being provided with a plurality of separated contact surfaces at different levels to contact with a surface of the other means to clamp the work in the work holder, resilient means to urge one of said means toward the other, and means to move one of said means across the path of the other thereby causing a hammerlike blow to be imparted to the clamping means, and means operating on one of said means to release the clamp.

23. In a metal cutting machine including a metal cutting tool, a work holder to support work in position to be cut by said tool, a clamp to retain the work in the work holder, automatically acting means including a resilient member to move the clamp into engagement with the work and means acting thereafter to deliver a sharp blow on said clamping mechanism to cause it to grip the work.

24. In a metal cutting machine, including a metal cutting tool, a series of interconnected work holders arranged in an endless chain formation and provided with recesses in the bottom walls, said recesses intersecting the front wall and one side wall, means to progress said chain, and a guideway on which the bottom walls of the work holders are supported during the cutting operation whereby chips and other waste materials are ejected from said guideway.

25. In a metal cutting machine, a work holder arranged to receive objects to be cut, means to clamp said objects in position on the work holder, a wedge operatively connected to said clamping means, means including a pair of relatively movable coacting members one of which is operatively connected to said wedge, means to cause one of said members to strike the other member to move said wedge, one of said members having two surfaces arranged to successively contact with the other member, one of said surfaces arranged to cooperate with the other member to position the wedge to cause the clamp to grip the work, and the other of said surfaces arranged to cooperate with the other member to increase the pressure on the wedge and thereby increase the gripping action of the clamp.

26. In a metal cutting machine, including a metal cutting tool, a work holder to support work in position to be cut by said tool, a clamp, a wedge operative on the clamp to cause the clamp to retain work in the work holder, automatically acting means to deliver a plurality of successive blows to said wedge, each of said blows acting to increase the gripping pressure of said clamp.

27. In a metal cutting machine, including a metal cutting tool, a frame including a guideway, a series of work holders pivotally interconnected in an endless chain formation, means to progress said chain along the guideway, each work holder including means to support a work piece in position thereon and a clamp pivotally connected with the work holder for movement into and out of contact with the work supported thereby, a member comprising a wedge bar slidably mounted in said work holder and operatively connected to said clamp to cause the clamp to engage the work, a member pivotally connected to the frame of the machine, a spring carried by the frame and operating to maintain the pivoted member in the path of the first named member, one of said members having a camming surface to engage the other member consequent upon the progress om the work holder through the guideway to compress said spring and cause the clamp to engage the work, one of said members having its initial contact surface abruptly interrupted and a second surface separated from the first surface and located behind the first surface relative to the direction of travel of the work holder and in a path to be engaged by the other member subsequent to its disengagement with the first surface.

28. The combination with a metal cutting machine including a metal cutting tool, of a main frame, a series of interconnected work holders arranged to retain work to be operated on by the tool, means to position the work on such work holder, including resilient means carried by the adjacent work holder and independent clamping means carried by each work holder to clamp the positioned work, and resilient means carried by the frame and operable on the clamping means of each work holder in succession to cause the clamping means to grip the work.

29. The combination with a metal cutting machine, including a metal cutting tool, a series of interconnected work holders, a guideway for said work holders, means to progress said work holders through said guideway, a work engaging member carried by each work holder, means slidably mounted in each work holder in a direction transverse to the direction of progress of said work holders, and operably connected to said work engaging member to cause said member to engage the work, resilient means carried by said guideway and operable on said sliding means consequent upon the travel of said work holders through said guideway to cause said work engaging member to engage the work, and means carried by said guideway to engage said sliding means to cause the work to be disengaged and wherein the work is automatically discharged consequent upon the travel of said workholders.

EDGAR E. NYGREN.